United States Patent
Tökés et al.

(10) Patent No.: US 6,759,797 B2
(45) Date of Patent: Jul. 6, 2004

(54) COMPACT FLUORESCENT LAMP

(75) Inventors: József Tökés, Budapest (HU); Sándor Lukács, Veröce (HU); István Würsching, Budapest (HU); István Kerényi, Budapest (HU)

(73) Assignee: General Electric Company, Schenectady, NY (US)

(*) Notice: Subject to any disclaimer, the term of this patent is extended or adjusted under 35 U.S.C. 154(b) by 110 days.

(21) Appl. No.: 09/882,842

(22) Filed: Jun. 15, 2001

(65) Prior Publication Data

US 2002/0190625 A1 Dec. 19, 2002

(51) Int. Cl.$^7$ ................................................ H01J 5/48
(52) U.S. Cl. .................. 313/318.01; 313/493; 313/634; 313/635; 313/317; 313/318.09; 313/318.02; 362/266; 362/216
(58) Field of Search ................................. 313/493, 634, 313/635, 317, 318.09, 318.02; 362/266, 216

(56) References Cited

U.S. PATENT DOCUMENTS

| | | | | |
|---|---|---|---|---|
| 2,279,635 A | * | 4/1942 | Morley .......................... | 313/25 |
| 2,281,579 A | * | 5/1942 | Henninger et al. ............ | 445/53 |
| 2,788,462 A | * | 4/1957 | MacFarlane ................. | 313/612 |
| 3,764,844 A | * | 10/1973 | Schmidt ..................... | 313/110 |
| 4,959,588 A | * | 9/1990 | Vida et al. .................... | 313/625 |
| 5,675,215 A | * | 10/1997 | Watson et al. .............. | 313/493 |
| 5,751,104 A | * | 5/1998 | Soules et al. ................ | 313/493 |
| 5,705,883 A | | 6/1998 | Soules et al. | |
| 6,633,128 B2 | * | 10/2003 | Ilyes et al. ................... | 313/634 |
| 2002/0180352 A1 | * | 12/2002 | Ilyes et al. ................... | 313/573 |

FOREIGN PATENT DOCUMENTS

| | | |
|---|---|---|
| DE | 41 33 077 A1 | 4/1993 |
| WO | WO 94/29895 | 12/1994 |

* cited by examiner

Primary Examiner—Nimeshkumar D. Patel
Assistant Examiner—Holly Harper
(74) Attorney, Agent, or Firm—Fay, Sharpe, Fagan, Minnich & McKee, LLP

(57) ABSTRACT

This invention concerns a compact fluorescent lamp with a double helix shaped discharge tube in which the two strands of the helix are constituted by two helix shaped tube portions. These tube portions define a central axis of the discharge tube. The double helix formed by the discharge tube has a central section and a first end section. These sections are defined along the central axis, and the lamp base for receiving ends of the tube portions is disposed at the first end section. An inner diameter of the central section of the helix is larger than an inner diameter of the first end section. The invention further relates to a method and apparatus for manufacturing coiled shaped discharge tubes, in particular the above described discharge tube of the discharge lamp. A radially segmented molding core is used for manufacturing the discharge tube. Once the coiling of the discharge tube on the molding core is completed, the segmented molding core is shrunk radially, and then is withdrawn from the coiled discharge tube axially.

9 Claims, 11 Drawing Sheets

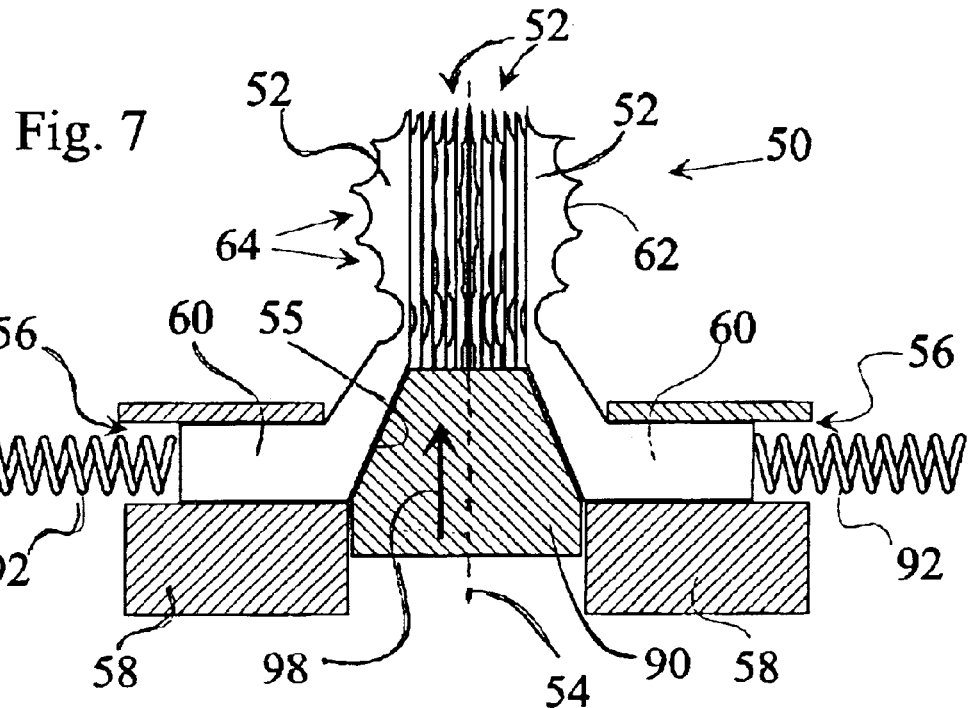
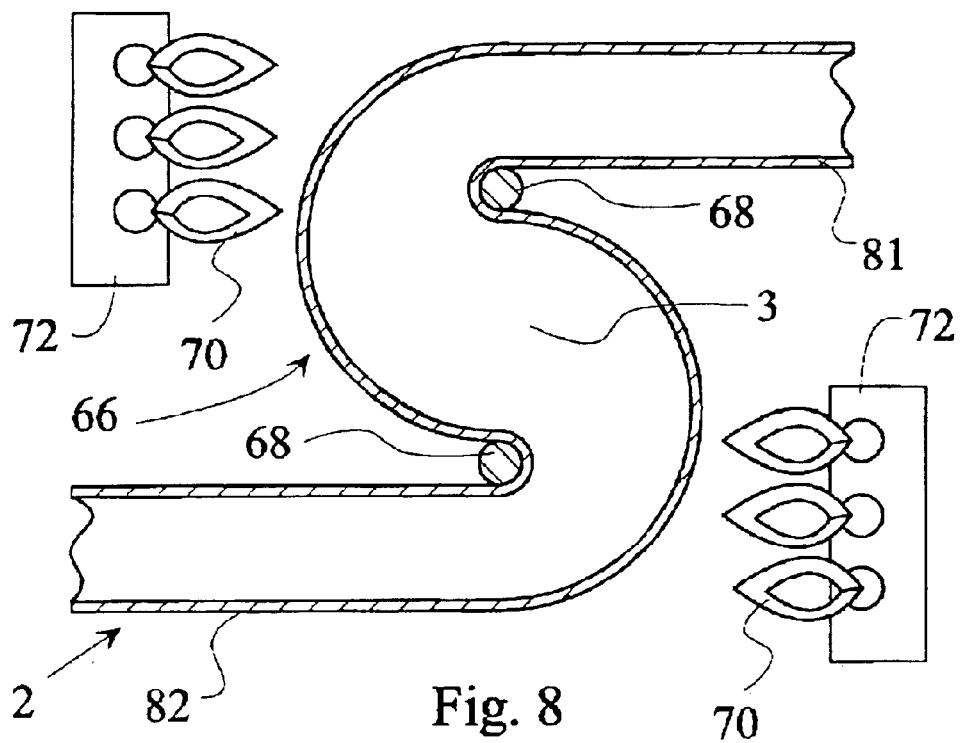

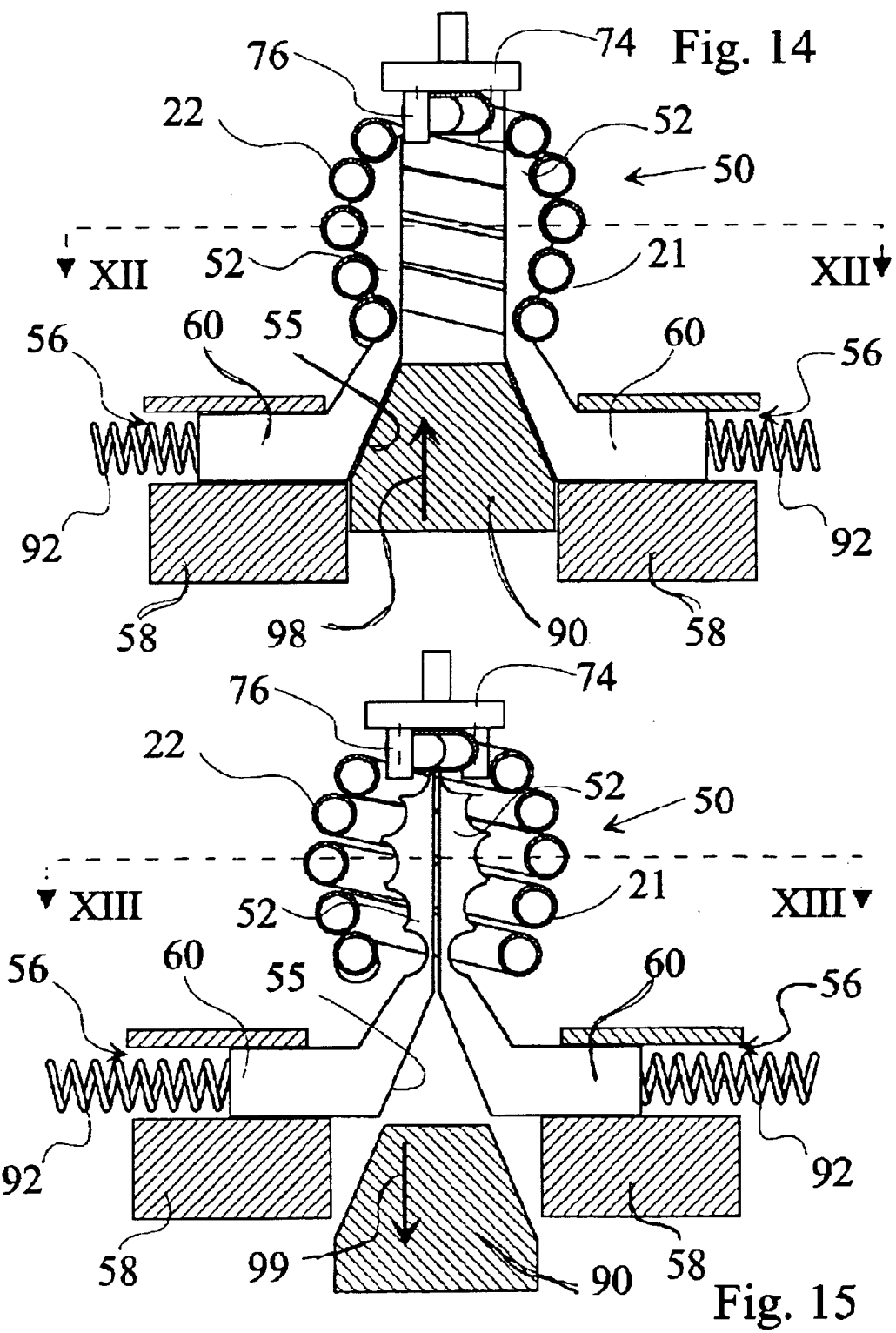

COMPACT FLUORESCENT LAMP

FIELD OF THE INVENTION

This invention relates to a compact fluorescent lamp with a discharge tube. The invention also relates to a method and apparatus for manufacturing the discharge tube of the lamp. The invention also concerns a molding tool used in the method and the apparatus.

BACKGROUND OF THE INVENTION

Low pressure discharge lamps are well known in the art. These lamps contain small doses of mercury which radiates under the influence of the discharge arc. In order to accomplish maximum light output, it is desirable to make the discharge tube of the lamp as long as possible which results in a large luminous surface. At the same time, to accomplish light outputs comparable to the light output of a traditional incandescent bulb requires the application of discharge tubes with a length in excess of tens of centimeters. Such tubes must be folded into various forms in order to make them compact enough for various lamp shades and covers which were originally designed for incandescent bulbs.

It is known to divide a long discharge tube into shorter sections, and to dispose the sections in a parallel configuration around a common central axis. As an example, a 60 cm long discharge tube may be divided into six sections, each ten centimeter long. The tubes are connected to each other through connecting necks, alternating at the top end or bottom end of the tubes. This configuration has the advantage of utilizing a relatively large surface area of the tube sections because the adjacent tubes leave approximately two thirds of the tube surface visible from the outside of the lamp. This part of the tube surface may be considered as the effective tube surface. However, this parallel configuration is still too long for many applications because the housing of the lamp, which normally contains the ballast electronics, also adds to the overall length of the discharge lamp. Further, the discharge arc exerts non-uniform load on the discharge tube which adversely effects the light output and the lifetime of the lamp.

A double helix-shaped compact fluorescent lamp is disclosed in U.S. Pat. No. 5,705,883. Such a double helix configuration results in a much more compact discharge tube, and the overall length of a coil with a total length of approximately 60 cm may be reduced to six centimeters, instead of the ten centimeters necessary for the parallel configuration. However, the effective lighting area of the discharge tube is reduced, because approximately one half of the discharge tube surface is visible only to the outside apart from the top turn of the helix. Therefore, the luminous efficacy of this known lamp is not completely satisfactory.

In the lamp shown in U.S. Pat. No. 5,705,883, the double helix formed by the discharge tube has an essentially constant inner and outer diameter, apart from the sealed ends of the discharge tube which are bent inwards. The bending of the tube ends is made in a separate manufacturing step. The bending of the ends does not influence the effective surface of the discharge tube, as the bent ends are inserted into a supporting housing.

German Patent Application No. DE 41 33 077 discloses another double helix shaped discharge lamp. In this known discharge lamp, there is a cold chamber positioned at the top of the lamp between the two ends of the tube portions constituting the strands of the double spiral. There is a relatively large distance between the turns of the two strands of the helix, so that the surface of the discharge tube turning inwards is also partly visible, adding to the effective area. However, the large distance between the turns again results in a large longitudinal dimension of the coil to the detriment of the overall compactness of the lamp.

Another double helix shaped compact fluorescent lamp is disclosed in the document WO 94/29895. The double helix of this lamp has a central section and an end section. The sealed ends of the discharge tube are disposed at the end section. The inner diameter of the central section of the helix is smaller than the inner diameter of the end section. As a result, the overall lighting efficiency of the discharge tube does not surpass that of the discharge tube known from U.S. Pat. No. 5,705,883, while achieving shorter total discharge tube length due to the gradually decreasing diameter of the coil, and as a result, decreased light output. Generally, the lighting efficiency of this lamp is riddled with the same problems as the above mentioned lamps known from U.S. Pat. No. 5,705,883 and from German Patent Application No. DE 41 33 077. The compactness of the lamp is also less satisfactory, because the sealed ends add to the total length of the coiled discharge tube.

Therefore, there is a need for a discharge lamp which exhibits improved lighting efficiency combined with compact dimensions of the coiled discharge tube, particularly a short overall length of the coil formed by the discharge tube.

SUMMARY OF THE INVENTION

In an exemplary embodiment of the present invention, there is provided a compact fluorescent lamp comprising a double helix shaped discharge tube. The discharge tube includes two helix shaped tube portions which form the two strands of the double helix. The tube portions define a central axis of the discharge tube. The double helix constituted by the tube portions has a central section and a first end section. These sections of the helix are defined along the central axis, i. e. the sections are disposed along the central axis. The lamp base for receiving ends of the tube portions is disposed at the first end section. An inner diameter of the central section of the helix is larger than an inner diameter of the first end section.

The lamp with the discharge tube of the above-described design has an improved luminous efficacy combined with compact size and an aesthetic appearance, as compared with known discharge lamp designs. The two tube portions of the discharge tube forming the strands of the helix may be easily formed starting from a single integral glass tube, thereby avoiding imperfect joints between discharge tube sections.

In an exemplary embodiment of another aspect of the present invention, there is provided a method for manufacturing a coil shaped discharge tube for a compact fluorescent lamp. The method is applicable for the manufacture of discharge tubes in which the coil formed by the discharge tube has a larger inner diameter at a central section than an inner diameter at a first end section. The method comprises the following steps. A segmented molding core provided, and the segments of the core define an external envelope surface corresponding to the desired inner diameter of the coil. At least a part of the discharge tube is heated to a softening temperature, and the heated discharge tube is wound on the molding core. Thereafter, the discharge tube is cooled to a solidification temperature.

After cooling of the discharge tube, the segments of the molding core are withdrawn in a radial direction towards the center of the coil. Thereafter, the segments are withdrawn from the coil in an axial direction.

The proposed method is mostly useful when the coil is closed at an end towards the section with a larger diameter. This is the case with the proposed discharge tube which is formed as a double helix, and the sealed ends of the discharge tube are disposed at the section having a smaller inner diameter than a diameter of its central section.

In an exemplary embodiment of still another aspect of the present invention, there is provided an apparatus for manufacturing a coil shaped discharge tube for a compact fluorescent lamp, particularly the suggested double helix shaped compact fluorescent lamp. The apparatus is suitable for the manufacturing of discharge tubes in which the coil formed by the discharge tube has a larger diameter at a central section than a diameter at an end section. The apparatus comprises a molding core with an envelope surface corresponding to the inner surface of the discharge tube forming the coil. This molding core comprises segments which define the envelope surface of the core. The segments are arranged for displacement in a radial direction relative to the central axis of the coil.

The apparatus further comprises means for controlling the displacement of the segments in a radial direction relative to the central axis of the coil, and means for heating at least a part of the discharge tube to a softening temperature. The apparatus also has means for holding the discharge tube in an oriented position relative to the molding core and means for winding the softened discharge tube onto the molding core.

In an exemplary embodiment of still another aspect of the present invention, there is provided a molding core for manufacturing a coil shaped discharge tube, for use in the apparatus.

The method, the apparatus implementing the method and the molding core used in the apparatus ensures a fast and industrial-scale manufacturing of coil shaped discharge tubes, particularly double helix shaped discharge tubes in which the inner diameter of the double helix is smaller at the end of the helix than the inner diameter of a central section of the helix.

BRIEF DESCRIPTION OF DRAWINGS

The invention will now be described with reference to the enclosed drawings where FIG. 7 is a cross section of the molding core shown in FIG. 6 taken along the line VII—VII in FIG. 6, FIG. 8 illustrates an initial manufacturing step of the discharge tube shown in FIG. 2, FIG. 14 is a cross section of the molding core and the discharge tube shown in FIG. 12 taken along the line XIV—XIV in FIG. 12, FIG. 15 is a cross section of the molding core and the discharge tube shown in FIG. 13 taken along the line XV—XV in FIG. 13.

DETAILED DESCRIPTION OF THE INVENTION

Figure 1:
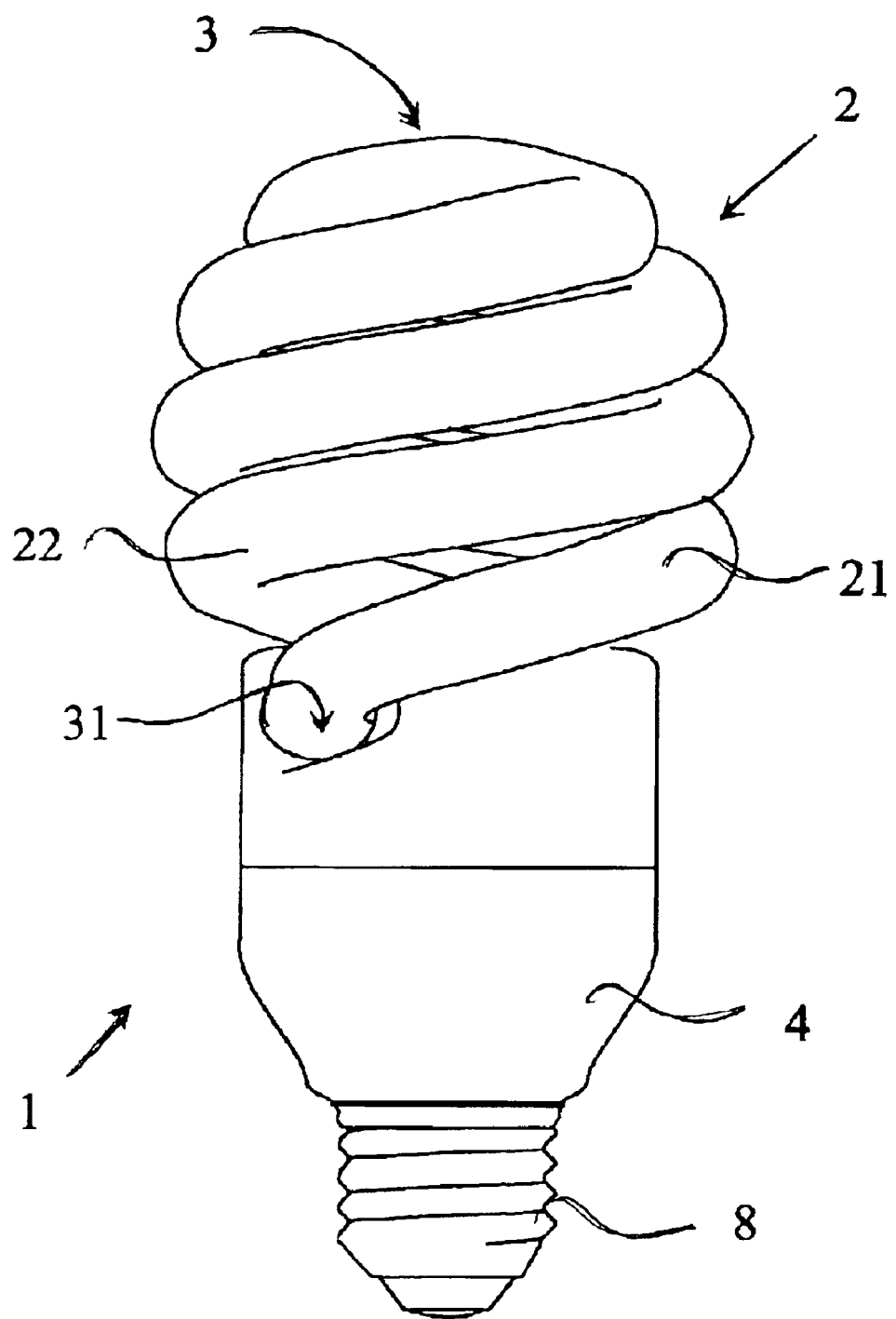
FIG. 1 is a side view of a compact fluorescent lamp with a double helix shaped discharge tube having a substantially ellipsoidal enveloping surface.
Figure 2:
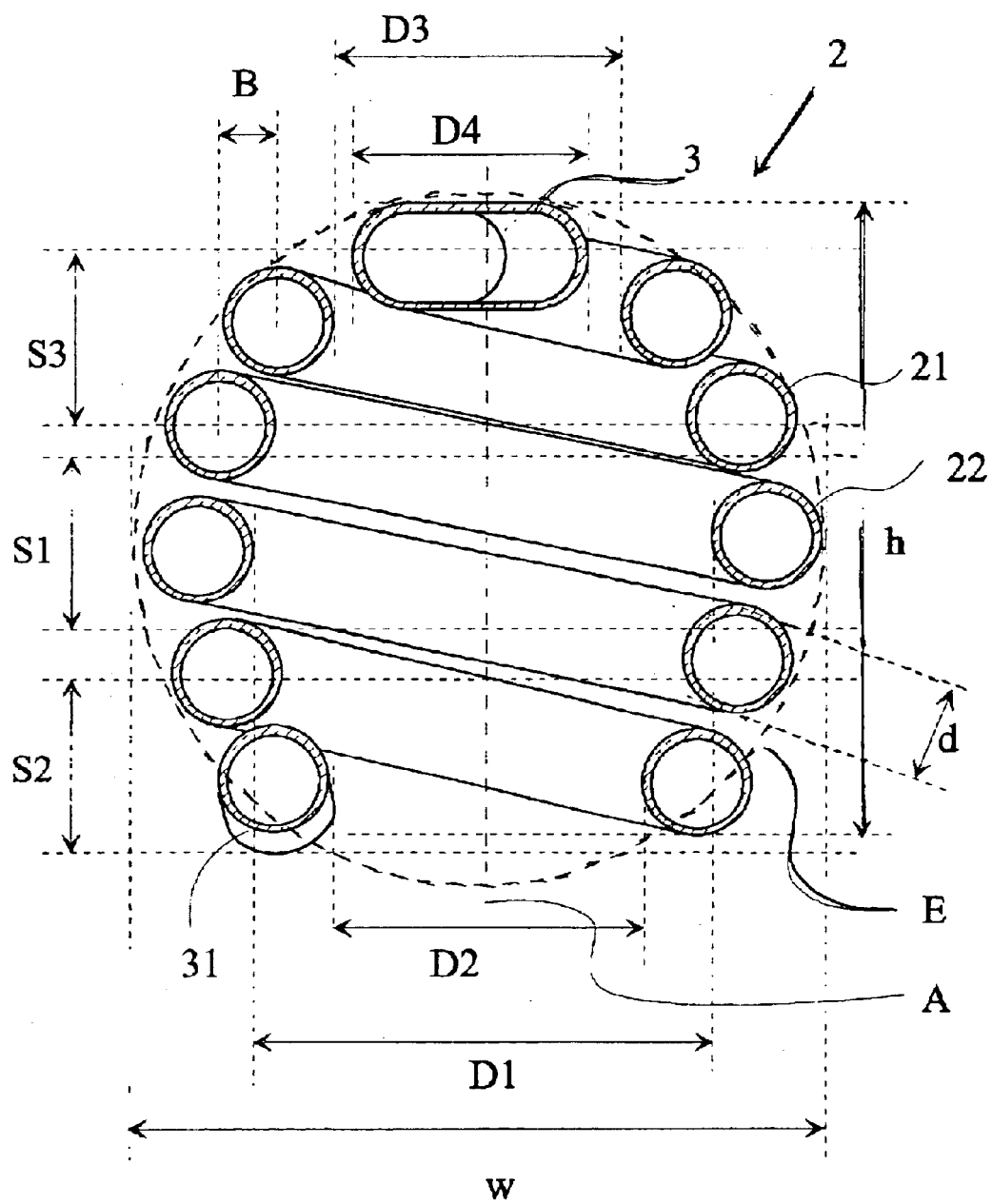
FIG. 2 is a cross section of the discharge tube of the compact fluorescent lamp shown in FIG. 1.

Referring now to FIGS. 1 and 2, there is shown a low pressure arc discharge lamp 1. The lamp 1 has a discharge tube 2, the ends 31 of which are inserted into a lamp housing 4 or lamp base. The ends 31 are sealed. The lamp 1 of FIG. 1 has two spiral shaped discharge tube portions 21 and 22 which are interconnected through a cold chamber portion 3 at the upper ends of the tube portions 21 and 22.

The discharge tube 2 is mechanically supported by the lamp housing 4. The lamp housing 4 surrounds the sealed ends 31 of the discharge tube 2. More precisely, the sealed ends 31 of the tube portions 21,22 are within the lamp housing 4, while the major part of the tube portions 21,22 is external to the lamp housing 4. The lamp 1 is of a type where light is emitted by a phosphor layer deposited on the inner surface of the discharge tube 2, the phosphor being excited by a discharge arc. The electrons of the discharge arc are emitted from a heated filament (not shown). The filaments are contained at the sealed ends 31 of the discharge tube 2. Such a discharge lamp arrangement is known by itself. The lamp housing 4 also contains the electronic ballast circuit of the lamp (not shown in the figures). In a typical embodiment, the lamp housing 4 is equipped with a screw terminal 8 which fits into a standard screw socket (not shown).

As best seen in FIGS. 1 and 2 and explained above, the low-pressure discharge lamp 1 comprises a double helix shaped discharge tube 2 including two spiral shaped tube portions 21,22. The discharge tube 2 is wound around a central axis A. Thus the discharge tube 2 itself is formed from the helix shaped discharge tube portions 21,22. With other words, the helically wound discharge tube portions 21,22 constitute the strands of a double helix thread which are joined to each other directly or through the cold chamber 3, while being wound around the central axis A as with the exemplary embodiment shown in the drawings. In this manner, the tube portions 21,22 define the central axis A of the discharge tube 2. The pitch of the discharge tube portions 21 allows the joining of the tube portions, i.e. enough space is left among the threads of a tube portion to accommodate the threads of the other discharge tube portion. Thus the discharge tube 2, which constitutes in practice the bulb of the lamp 1, forms a double helix.

Figure 3:
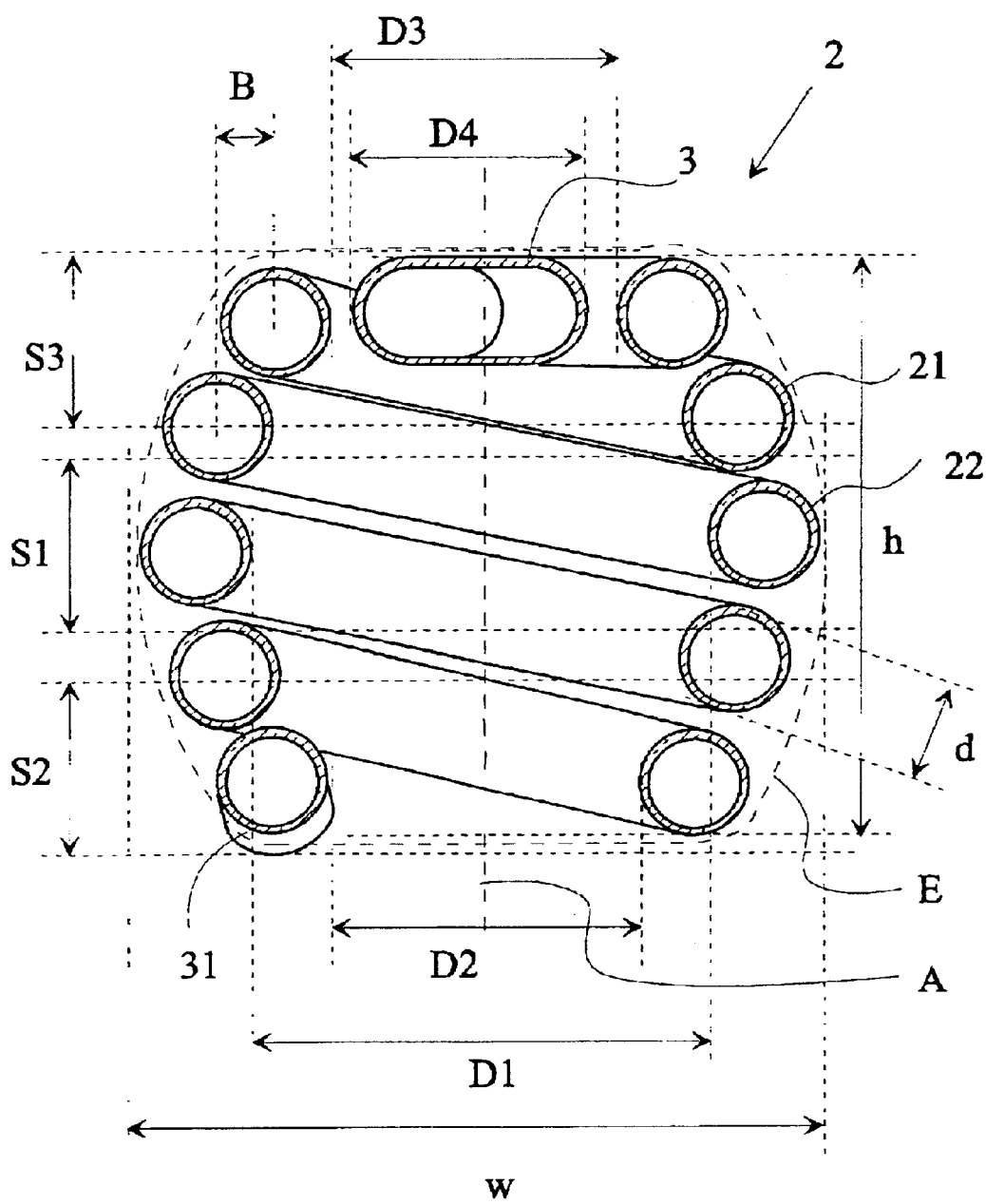
FIG. 3 is a cross section of another double helix shaped discharge tube with a barrel-shaped enveloping surface.

Turning now to FIG. 2, it is indicated that the double helix has a central section S1 and a first end section S2. These sections of the helix are defined along the central axis A. The lamp base or housing 4 is disposed at the first end section S2, i. e. the ends 31 of the discharge tube are adjacent to those parts of the discharge tube which form the first end section S2. As best seen in FIGS. 2 and 3, an inner diameter D1 of the central section S1 of the helix is larger than an inner diameter D2 of the first end section S2.

Since the diameter d of the discharge tube is substantially constant, the outer diameter of the discharge tube coil is also varying along the central axis A. With other words, the discharge tube 2 forms a coil which has a gradually increasing diameter moving away from the lamp base along the central axis A.

In the shown embodiments, the double helix also has a second end section S3. This second end section S3 is opposite to the lamp base. The inner diameter D1 of the central section S1 of the helix is larger than an inner diameter D3 of the second end section S3. As a result, the diameter of the coil formed by the discharge tube 2 again decreases past the central section S1 when moving away from the lamp base and towards the top of the lamp 1.

Due to these dimensions of the discharge tube, the successive threads of the coil are displaced relative to each other with a small radial distance B. The value of B is between 0.07 to 0.5 times the diameter d of the tube sections 21,22.

The resulting discharge tube has an increased effective lighting surface as compared with a double helix having a constant diameter. Neglecting the gap between the threads of the coil, the increase in the visible surface of the discharge tube is approx. 10–30% depending on the value of B as compared with the visible surface of a straight coil. At the same time, the light distribution towards the top of the lamp.

In the embodiment shown in FIG. 2, the discharge tube 2 has an external envelope E that is substantially spherical. Apparently, depending on the ratio between the width w and the height h of the tube, the external envelope E may be considered spherical or ellipsoidal. This embodiment is most preferred, because it has the most uniform light distribution.

Figure 4:
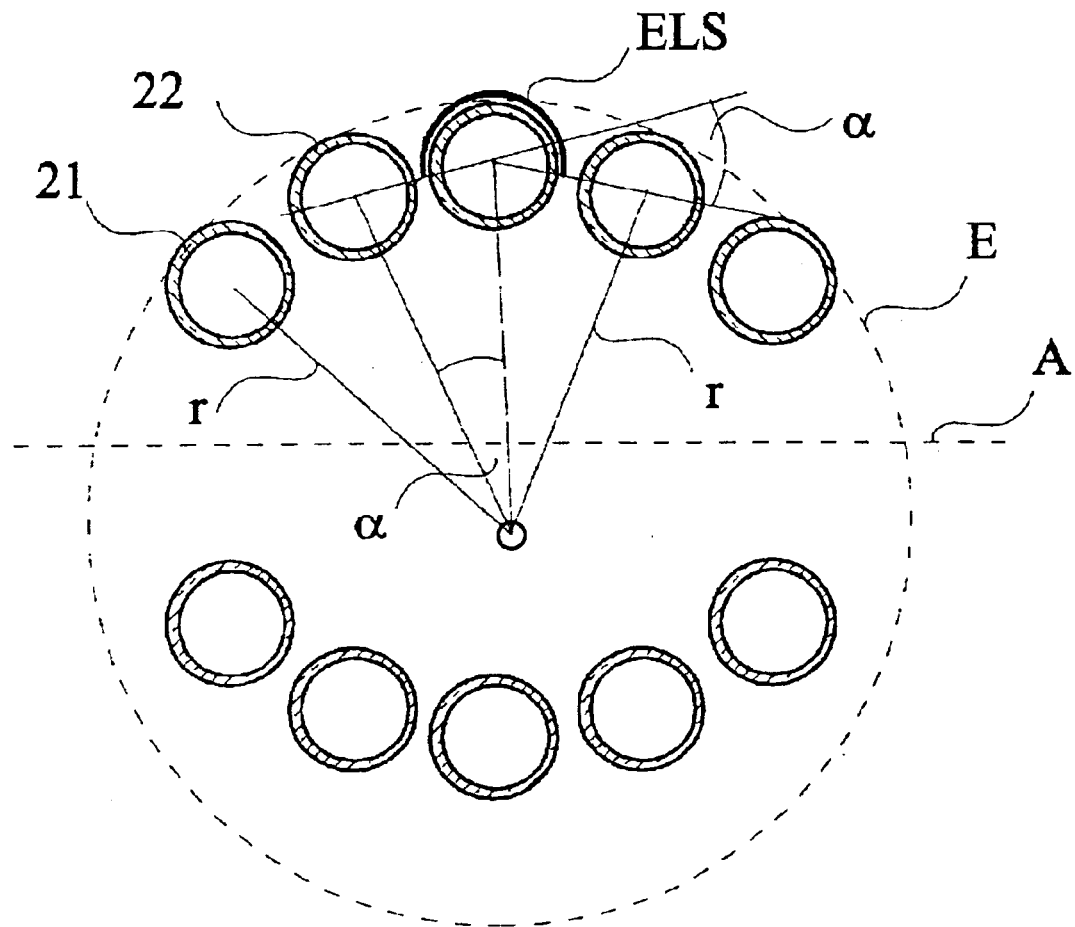
FIG. 4 is a schematic illustration of an effective lighting surface of the discharge tube shown in FIG. 2.
Figure 5:
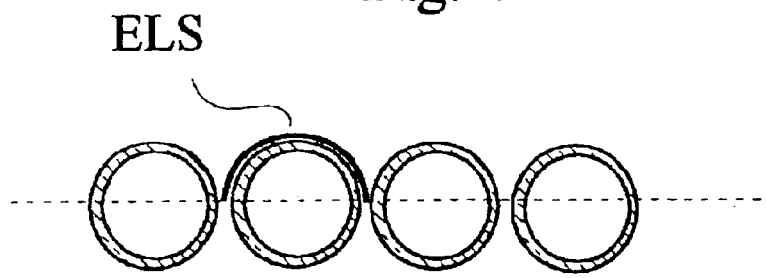
FIG. 5 is a schematic illustration of the effective lighting surface of a prior art discharge tube.

As shown in FIG. 4, the increase of the effective lighting surface ELS of one thread is approximately proportional with the angle α between the radii r of the threads of a coil with an enveloping surface E having a curvature radius (r+d/2) in a section parallel with the central axis A of the double helix. (d is the outer diameter of the discharge tube 2). The same applies to the increase in the total surface of the discharge tube. Therefore, the effective lighting surface ELS of the tube portions 21,22 which is useful as a lighting surface will increase with the proposed tube configuration. As a comparison, the effective lighting surface ELS of the threads of a known double helix shaped discharge tube is shown in FIG. 5 where the discharge tube is formed as a straight coil with an essentially constant diameter.

Beside the increase in the effective lighting surface, the proposed configuration also has the advantage that the light distribution and overall shape of the lamp 1 better approaches those of traditional incandescent bulbs. However, the enveloping surface E may be flat as well in the top region, particularly when circularly shaped cold chambers are used. In this case, the discharge tube will have a substantially barrel-shaped enveloping surface, similarly to that of the discharge tube shown in FIG. 3

In the embodiment shown in FIG. 3, the discharge tube 2 has an external envelope E that is substantially barrel shaped because the cold chamber 3 at the top of the lamp is at the same level as the uppermost threads of the coil. Such an embodiment may be advantageous if the total height h of the coil is limited, but the width w of the coil (in effect, the largest outer diameter of the coil) may be increased in order to increase the total length of the discharge tube 2.

The cold chamber 3 connects the upper ends of the spiral shaped tube portions 21,22, i. e. those ends opposite to the sealed ends 31. The cold chamber 3 contributes to the control of the mercury partial pressure within the discharge tube in a manner known by itself. In the embodiment shown in FIGS. 2 and 3, the cold chamber 3 has a first transversal dimension D4, in effect the width of the cold chamber 3. This transversal dimension D4 is measured substantially perpendicular to the central axis A. The first transversal dimension D4 of the cold chamber 3 is larger than the diameter d of the tube portions 21,22. In this manner, the cold chamber 3 has an increased cross-sectional area where the energy density of the discharge arc decreases thereby allowing a relative cooling of the wall of the cold chamber 3. Typically, the diameter d of the discharge tube 2 at the tube portions 21,22 is between 8–10 mm and the wall thickness is 0.8–1.2 mm. The first transversal dimension D4 of the cold chamber 3 is approx. the double of this value, i. e. the value of D4 is between 16–20 mm for a typical lamp of approx. 42 W power.

The discharge lamp 1 functions as follows. The ballast circuit assembled in the lamp housing 4 generates the voltage with appropriate parameters from the mains circuit voltage. This brings the gas fill of the discharge tube 2 into discharge state. The fill gas is an inert gas, for example argon, complemented by mercury for the purposes of light excitation. The mercury is excited by the discharge to emit UV radiation, and the UV emission is converted to visible light by the phosphor applied to the inner surface of the discharge tube 2. Therefore, it is desirable to exhibit the largest possible surface of the discharge tube 2 towards the surrounding environment. It is particularly desirable to increase the surface parts which are not only visible from the outside but from which the light may radiate essentially perpendicularly without being obstructed by the wall of the neighboring turns of the coil. This is because the largest light flux of the discharge tube is radiated perpendicularly from the surface. The proposed coil configuration directly increases these surface parts.

Figure 6:
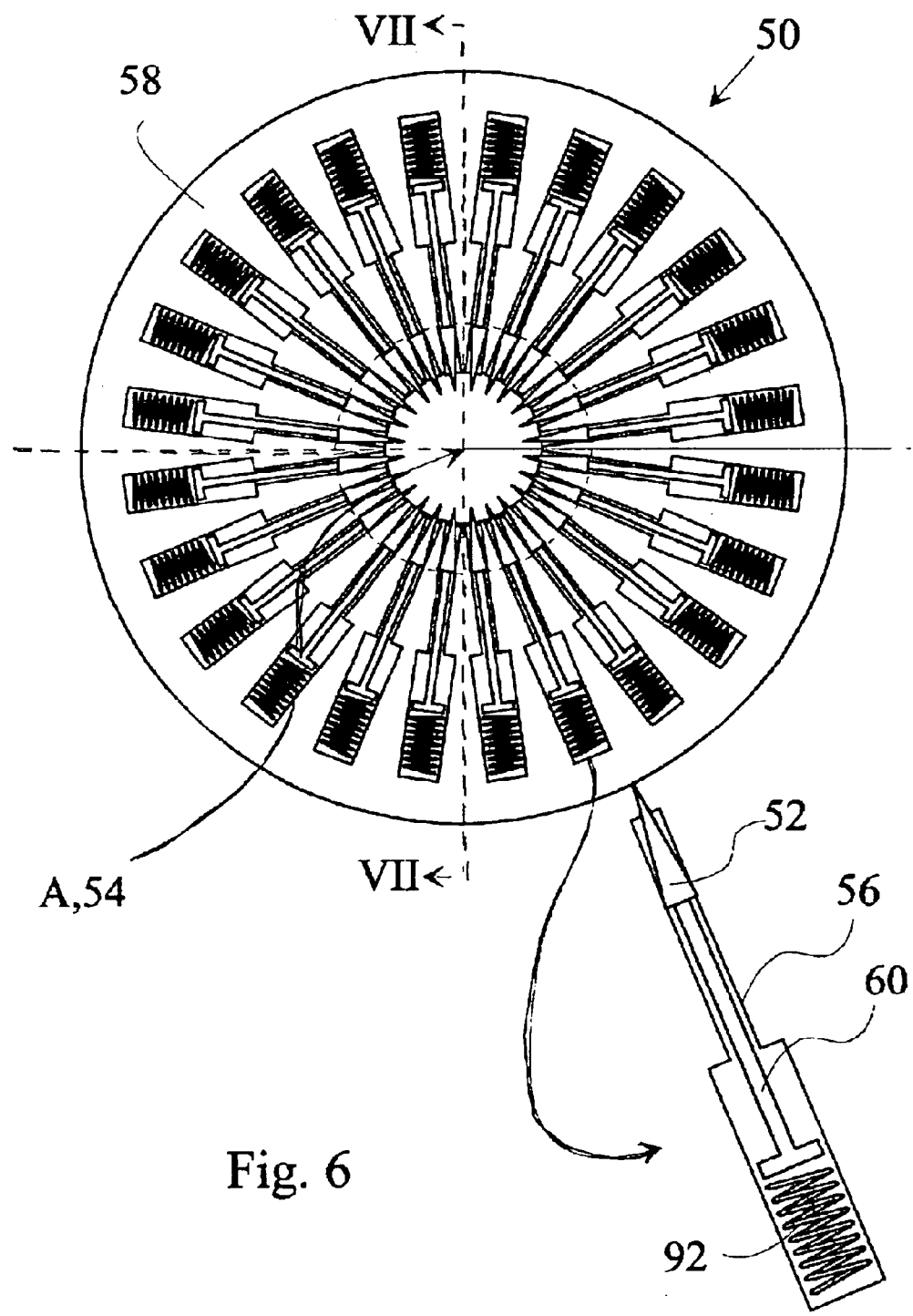
FIG. 6 is a top view of a molding core used in manufacturing the discharge tube shown in FIG. 2.

The discharge tube 2 shown in FIGS. 1 to 4 is manufactured with the method and apparatus explained with reference to FIGS. 6 to 16. The central element of the apparatus is a segmented molding core 50 which is best seen in FIGS. 6 and 7. The molding core 50 is equipped with segments 52. The segments 52 are arranged radially around a central axis 54 which coincides with the central axis A of the double helix of the discharge tube 2 when the latter is wound onto the molding core 50 as it will be explained below.

As shown on the enlarged detail of FIG. 6, the segments 52 are displaceable in a radial direction relative to the central axis A of the coil. This is accomplished with radially oriented grooves 56. The grooves 56 are formed in a support plate 58. The segments are supported by a supporting base 60 as best seen in FIG. 7, and the supporting base 60 itself is guided in the corresponding groove 56 of a support plate 58. In this manner, the radial displacement of the segments 52 is ensured because the grooves 56 are arranged in a radial direction relative to the central axis 54 of the molding core 50.

Figure 13:
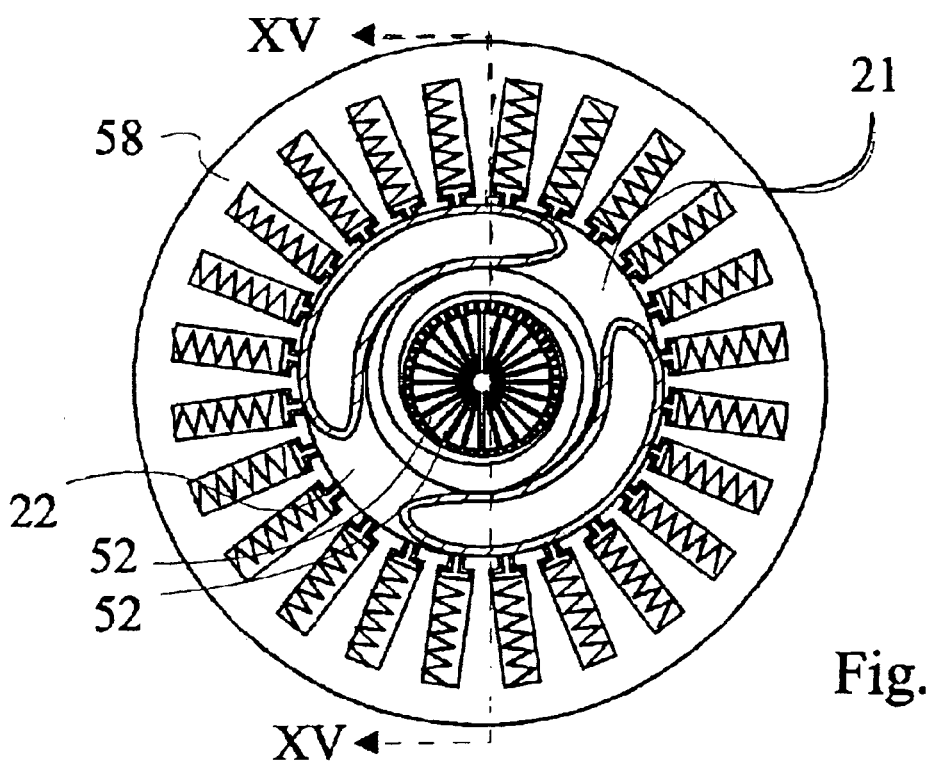
FIG. 13 is a top view of the molding core of FIG. 7, partly in section according to the plane XIII—XIII of FIG. 15, when the core segments are moved into the center in the position freeing the discharge tube from the molding core.

The segments 52 have an outer surface 62 which define an external envelope surface corresponding to the desired inner diameter of the coil. FIG. 7 illustrates the semi-circle shaped indentations 64 on the outer surfaces 62 which will receive the tube sections 21,22 of the discharge tube 2. As best seen in FIG. 6, the segments 52 have a substantially trapezoid or circle segment shaped cross section in a plane perpendicular to the central axis A of the coil. When the segments 52 are in a contracted position, as shown in FIGS. 13, 14 and 15, the segments 52 collectively form a "shrunk" rotational body with grooves following a double helix, but with a The forming of the double helix preferably starts with forming to an S-shape of a central portion 66 of the discharge tube 2. This central portion 66 constitutes the cold chamber 3 of the finished coiled discharge tube 2. The desired shape of the cold chamber 3 is formed, e. g. by blowing or casting the glass into a properly shaped mold. Thereafter, as shown in FIG. 8, the S shape of the discharge tube 2 is formed in this initial step by heating and bending the two free ends 81,82 of the discharge tube around two pins 68. The heating is done with conventional methods, e. g. with the flames 70 of a gas burner 72.

FIGS. 9 to 14 illustrate that the discharge tube 2 is formed as a double helix by winding it onto the molding core 50. During the winding, the discharge tube 2 is fastened at the central portion 66, while the two legs of the discharge tube 2, in effect the two tube portions 21,22 on two sides of the central portion 66 are wound on the molding core 50 simultaneously.

The discharge tube 2 is held in oriented position relative to the molding core 50 by fastening the central portion 66 relative to the molding core 50, with appropriate means intended for this purpose. In the embodiment shown in FIGS. 9 to 14, the means for holding the discharge tube 2 in an oriented position relative to the molding core 50 is a fork 74 receiving the central portion 66 of the discharge tube 2. The fork 74 has two pins 76 which are nearly identical in size to the pins 68 used for bending the initial S-shape of the central portion 66. During the winding of the discharge tube 2, the fork 74 is rotated synchronized with the support plate 58.

Figure 9:
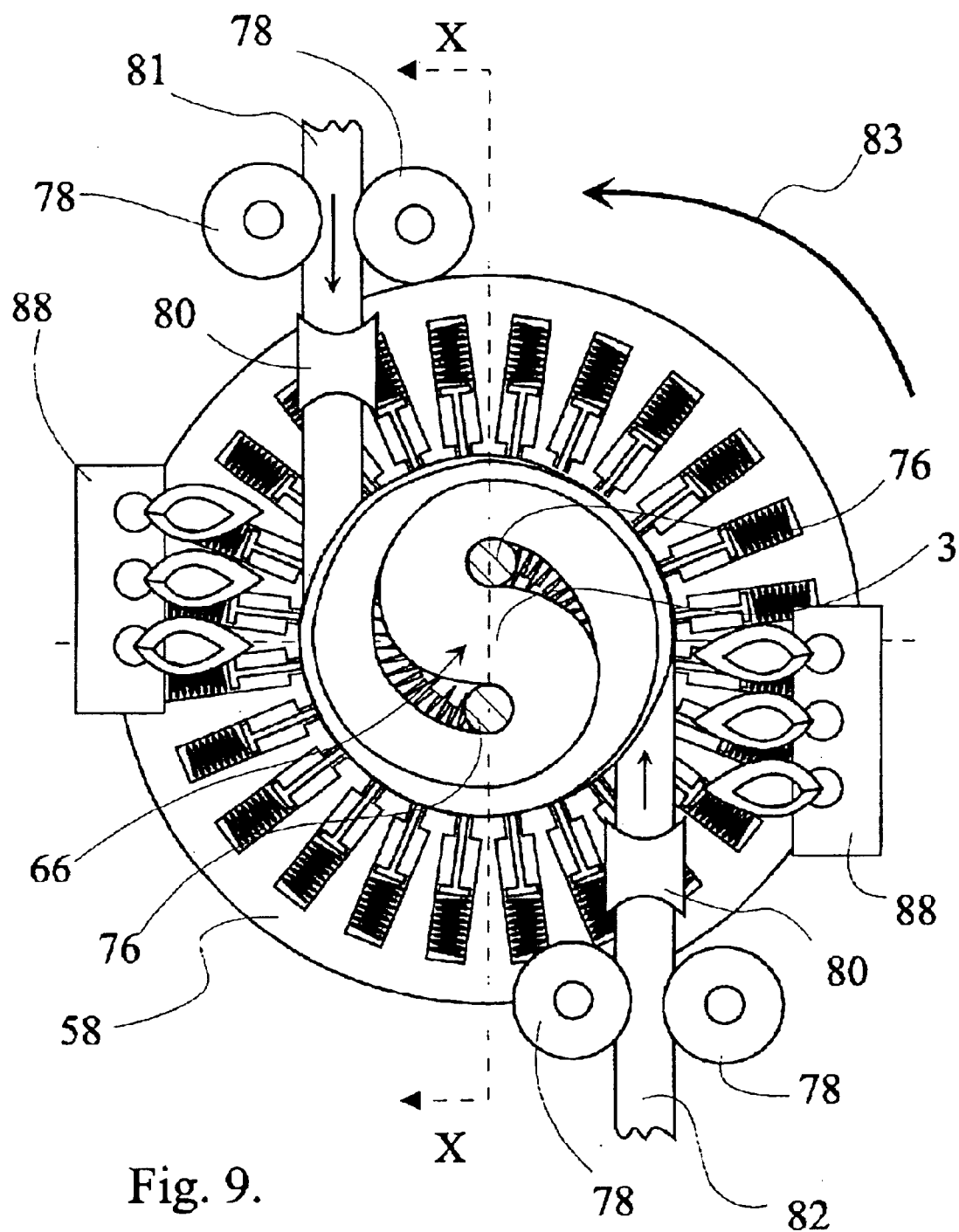
FIG. 9 is a top view of the molding core of FIG. 7, partly in section according to the plane IX—IX of FIG. 10, shown during the winding operation of a discharge tube similar to that shown in FIG. 2.
Figure 10:
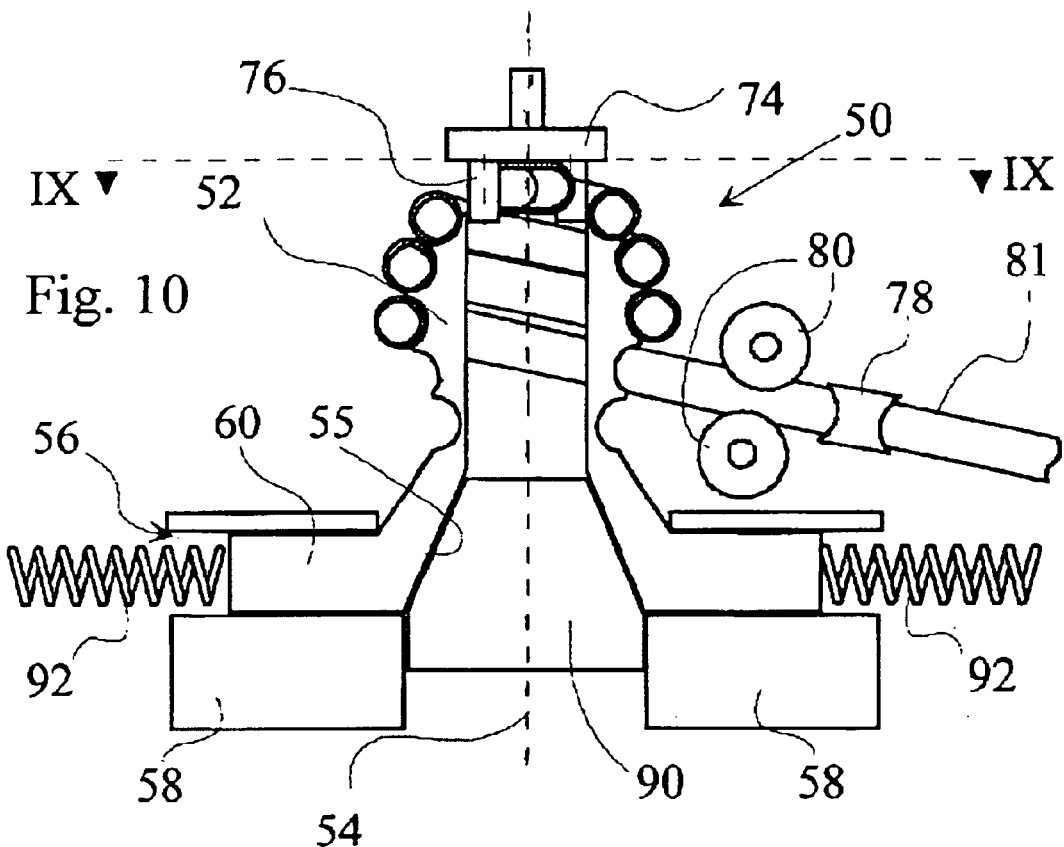
FIG. 10 is a cross section of the molding core shown in FIG. 9, taken along the line X—X in FIG. 9, during the winding operation of a discharge tube.
Figure 11:
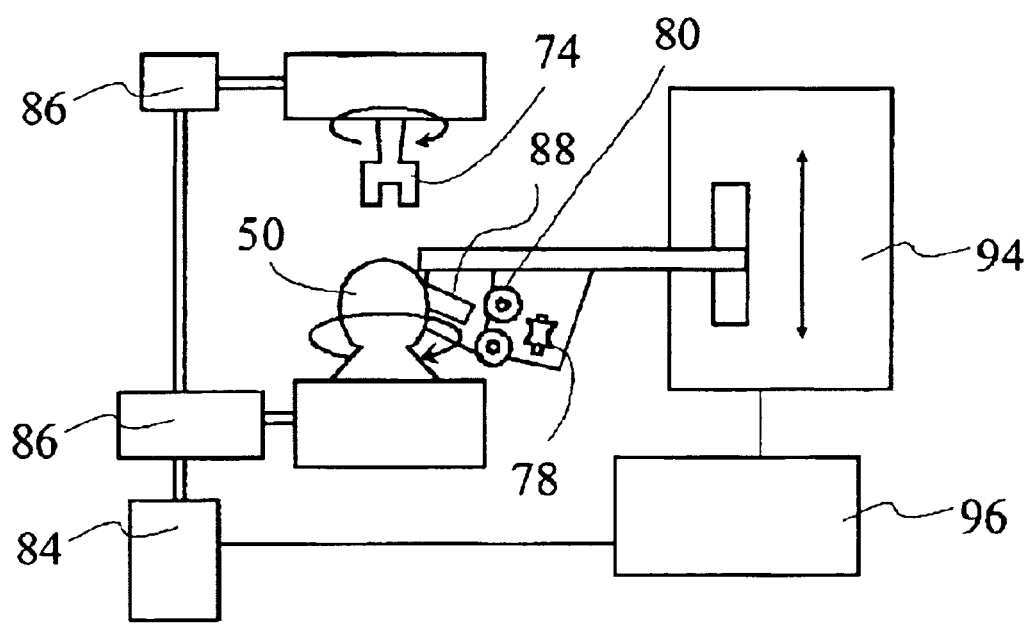
FIG. 11 is a schematic diagram illustrating the functional relation between certain elements of the discharge tube manufacturing apparatus.

The winding of the discharge tube is done while parts of the discharge tube 2 are heated to a softening temperature. Only those parts are heated to the softening temperature which are being bent under the bending forces exerted on the tube sections 21,22 by the slowly rotating molding core 50 and guiding means, e. g. rollers 78 and 80 for guiding the free ends 81,82 of the discharge tube 2, as shown in FIGS. 9 to 11. The rotation of the molding core 50 is done with suitable means therefor, preferably an electric motor 84 with a gear transmission 86 which rotates not only the molding core 50 but also the fork 74. The heating is done with conventional methods, e. g. with the flames of a gas burner 88 similar to those of the burners 72. Other suitable heating means may comprise means for blowing of hot air on the parts to be heated.

The suitable softening temperature of a glass discharge tube 2 is between 500–700° C. dependent on the applied glass type. In case of a discharge tube made of soda lime glass, the softening temperature is approx. 620–700° C. For lead glass, the softening temperature is approx. 500–560° C.

It is also advisable to preheat the segments 52 before the winding operation, preferably to a temperature in the vicinity of, but below the softening temperature, e. g. to 400–600° C. again dependent on the applied glass type, e. g. to 520° C. with soda lime glass, and 450° C. for lead glass.

The movement of the means for guiding the free ends 81,82 of the discharge tube 2 is also controlled vertically, i. e. parallel with the central axis 54 of the molding core 50. A vertical moving mechanism 94 operating in a known fashion moves the rollers 78 and 80 downwards according to the thread height of the coil and the rotation of the molding core 50 when the discharge tube 2 is wound on the molding core 50. The vertical moving mechanism also holds the burners 88. The vertical movement of the guiding means and the rotation of the molding core 50 is synchronised by a control unit 96. This latter is illustrated only schematically in FIG. 11 together with the electric motor 84, the gear transmission 86 and the vertical moving mechanism 94.

The rotating of the molding core 50 is effected by rotating the rotatably mounted support plate 58 together with the means for controlling the displacement of the segments 52 along the support plate 58 which will be explained below.

In the embodiment shown in the figures, the segments 52 comprise an oblique surface 55 partly facing the central axis 54 of the molding coil, as best seen in FIG. 7. In this case, as shown in FIGS. 7, 10, and 14 to 16, the means for controlling the displacement of the segments 52 comprises a conical pin 90. The pin 90 is positioned below the molding core 50, so that the central longitudinal axis of the pin 90 coincides with the central axis 54 of the molding core 50. In this manner the pin 90 is arranged for axial displacement substantially concentrically with the central axis A of the coil which is wound onto the molding core 50 in the course of manufacturing the discharge tube.

The axial movement of the pin 90 controls the radial movement of the segments 52 in the grooves 56 of the support plate 58. When the pin 90 is moved upwards in the direction of the arrow 98 in FIG. 7, the conical part of the pin 90 abuts the oblique surface 55 of the segments 52, and the segments 52 are pushed radially outwards. The means for controlling the displacement of the segments 52 also comprises springs 92 for urging the segments 52 towards the central axis 54 of the molding core 50, i. e. the central axis A of the coil. As a result, when the pin 90 is retracted downwards, the segments 52 move towards the center under the force exerted by the springs 92.

In the operational position, i. e. when the segments 52 are pushed out from the center under the influence of the pin 90, the distance between the parallel faces of the neighbouring segments is in the order of a few millimetres, depending on the number of the segments 52 and the dimensions of the desired coil form. This distance is small enough to be bridged by the softened glass wall of the discharge tube, and substantially no visible marks remain on the outside of the discharge tube after the winding onto the core.

From the above, it is apparent that the proposed apparatus comprises a molding core 52 with an envelope surface corresponding to the inner surface of the discharge tube 2 forming the coil, in the present embodiment, a double helix. This molding core 52 comprises segments 52 which together define the envelope surface of the complete molding core 52. The apparatus also has means for controlling the displacement of the segments 52 in a radial direction relative to the central axis A of the double helix shaped coil. In the present embodiment of the apparatus, this means is constituted primarily by the springs 92 placed in the grooves 56 of the support plate 58. The burners 88 form the means for heating the discharge tube 2 to a softening temperature, and the fork 74 acts as means for holding the discharge tube 2 in an oriented position relative to the molding core 50, while the tube portions 21 and 22 are wound on the molding core 50 with the appropriate means. These latter are constituted partly by the guiding means and the vertical moving mechanism 94.

Figure 12:
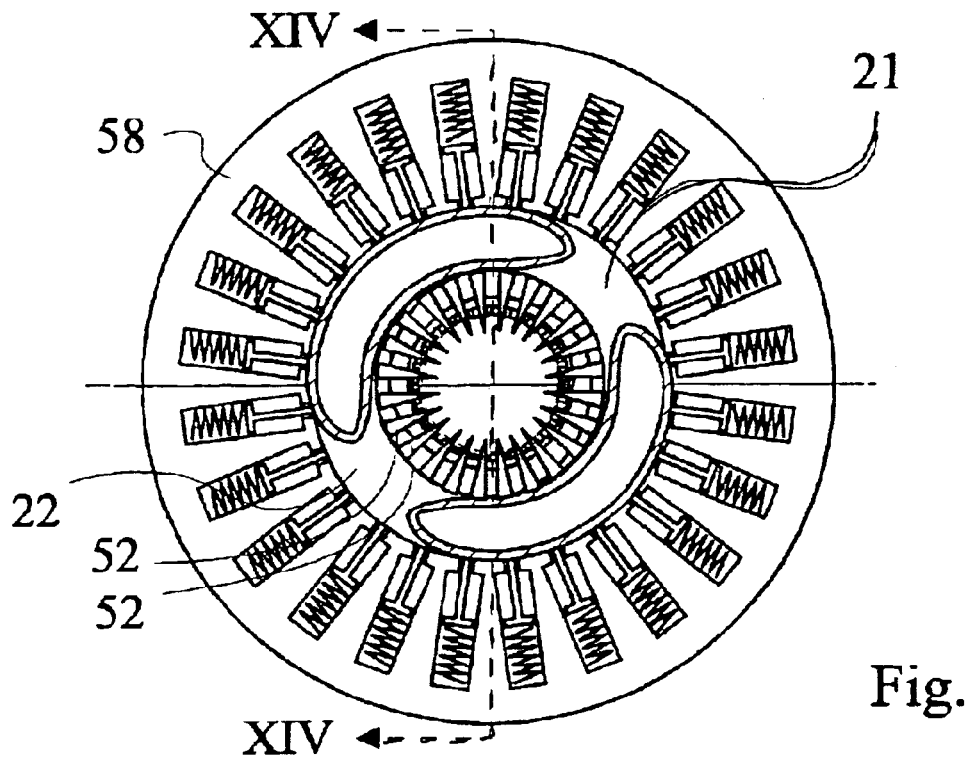
FIG. 12 is a top view of the molding core of FIG. 7, partly in section according to the plane XII—XII of FIG. 14, when the winding operation of a discharge tube is substantially completed and the segments of the molding core are still in operational position.
Figure 16:
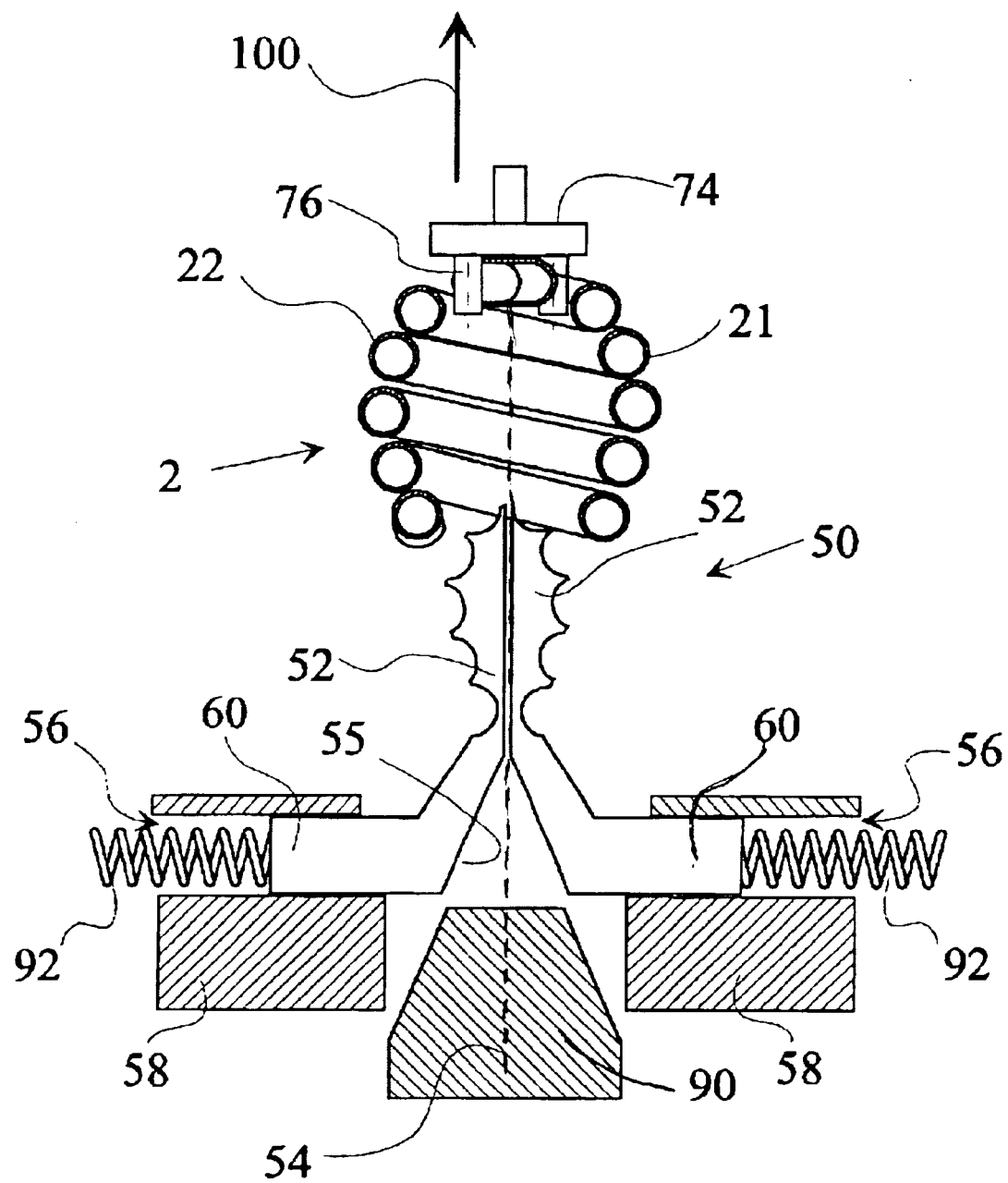
FIG. 16 is a cross section of the molding core and the discharge tube in a view similar to FIG. 15 illustrating the axial withdrawal of the molding core from the coil shaped discharge tube.

After winding the discharge tube 2 on the molding core 50 with the suggested apparatus, the discharge tube 2 is cooled to a solidification temperature, typically below 200° C. When the discharge tube 2 with the final coil shape has sufficiently cooled down, the segments 52 are withdrawn in a radial direction towards the center of the coil, as shown in FIGS. 12 and 15. This is effected by moving the pin 90 downwards, in the direction of the arrow 99, so that the springs 92 may push the support bases 60 towards the central position in the support plate 58. Finally, as illustrated in FIG. 16, the discharge tube 2 is lifted from the molding core 50 upwards, in the direction of the arrow 100, i. e. the segments 52 are withdrawn from the coil in an axial direction.

The embodiment shown in the figures is a lamp with a lamp base 8 which fits into a screw-in type of socket (also called as an Edison-type socket). However, the lamp may have other types of terminal. Notably, a so-called plug-in type of terminal and socket is commonly used with compact fluorescent lamps. It is also known to place the ballast electronics in a housing different from the housing supporting the discharge tube, so that the defunct discharge tube may be discarded, but the expensive electronics components of the ballast can be used further with another discharge tube. In this case there is also a socket-type connection between the two housings which facilitate the replacement of the discharge tube.

The suggested double helix shaped low pressure gas discharge lamp has several advantages. Firstly, its effective lighting surface is increased compared with a known double helix lamp of equal length and similar size. The light distribution of the proposed lamp is also more uniform. Further, the discharge lamp also has an aesthetic and pleasing appearance. The suggested method and apparatus for the manufacture of the discharge tube of the lamp is suitable for incorporation into automatic lamp manufacturing lines, thereby ensuring fast, efficient and cost-effective production of the helix shaped discharge tubes.

The invention is not limited to the shown and disclosed embodiments, but other elements, improvements and variations are also within the scope of the invention. For example, the proposed apparatus is well suitable for manufacturing not only double helix shaped lamps, but other lamps with other coil-likes shape as well.

What is claimed is:

1. A compact fluorescent lamp comprising:
   a double helix shaped discharge tube including two helix shaped tube portions, the tube portions defining a central axis of the discharge tube,
   the double helix having a central section and a first end section, the sections of the helix being defined along the central axis,
   a lamp base for receiving ends of the tube portions, said lamp base being disposed at the first end section, and an inner diameter of the central section of the helix being larger than an inner diameter of the first end section,
   a cold chamber portion connecting the ends of the helix shaped tube portions, a height dimension of the cold chamber portion measured in a direction parallel to the central axis being substantially the same as the diameter of the tube portions.

2. The compact fluorescent lamp of claim 1 in which the double helix has a second end section, the second end section being opposite to said lamp base, and an inner diameter of the central section of the helix is larger than an inner diameter of the second end section.

3. The compact fluorescent lamp of claim 1 in which the diameter of the tube portions is substantially constant.

4. The compact fluorescent lamp of claim 1 in which the double helix has an external configuration which is substantially spherical.

5. The compact fluorescent lamp of claim 1 in which the double helix has an external configuration which is substantially barrel-shaped.

6. The compact fluorescent lamp of claim 1 in which the double helix has an external configuration which is substantially ellipsoidal.

7. The compact fluorescent lamp of claim 1, wherein said cold chamber portion is substantially coplanar with said ends of the helix shaped tube portions.

8. A compact fluorescent lamp comprising:
   a double helix shaped discharge tube including two helix shaped tube portions, the tube portions defining a central axis of the discharge tube,
   the double helix having a central section and a first end section, the sections of the helix being defined along the central axis,
   a lamp base for receiving ends of the tube portions, said lamp base being disposed at the first end section, and an inner diameter of the central section of the helix being larger than an inner diameter of the first end section,
   a cold chamber portion connecting upper ends of the helix shaped tube portions, in which the tangential outer surface of at least one said upper end and the tangential outer surface of said cold chamber portion are coplanar in a plane perpendicular to said central axis of the discharge tube.

9. The compact fluorescent lamp of claim 8 in which the double helix has an external configuration which is substantially barrel-shaped.

* * * * *